United States Patent [19]

Slager et al.

[11] 4,419,669

[45] Dec. 6, 1983

[54] CONTROLLED SCINTILLATION RATE DECOY

[75] Inventors: Donald M. Slager, Long Beach; William C. Barker, Pacific Palisades, both of Calif.

[73] Assignee: TRW Inc., Redondo Beach, Calif.

[21] Appl. No.: 103,906

[22] Filed: Jan. 4, 1971

[51] Int. Cl.³ .................... H01Q 15/14; G01S 7/38
[52] U.S. Cl. ........................... 343/18 D; 343/18 E
[58] Field of Search ............... 343/6.8 R, 18 D, 18 E

[56] References Cited

U.S. PATENT DOCUMENTS

| 3,108,275 | 10/1963 | Chisholm | 343/18 E |
| 3,158,862 | 11/1964 | Chisholm | 343/18 D |
| 3,283,324 | 11/1966 | Norman | 343/18 E |
| 3,787,856 | 1/1974 | Pyrah | 343/18 D |
| 4,117,485 | 9/1978 | Gorr et al. | 343/18 E |

*Primary Examiner*—T. H. Tubbesing
*Attorney, Agent, or Firm*—Robert W. Keller; Donald R. Nyhagen

[57] ABSTRACT

A controlled scintillation rate decoy having microwave reflectors for reflecting incident radar energy in a manner to provide the decoy with a selected radar cross-section, and variable electrical impedance control means connected in electrical circuit with the reflectors for controlling the scintillation magnitude or scintillation rate of the decoy.

10 Claims, 5 Drawing Figures

CONTROLLED SCINTILLATION RATE DECOY

RELATED APPLICATIONS

Reference is made here to pending application Ser. No. 591,395, filed Oct. 28, 1966, entitled "Radar Target Simulator (U)".

BACKGROUND OF THE INVENTION

1. Field of the Invention

This invention relates generally to radar decoys and more particularly to such a decoy having means for varying its scintillation magnitude or scintillation rate.

2. Prior Art

A variety of techniques have been devised to modify or reduce the radar cross-section or signature of a space target, such as a missile or satellite, to prevent its identification by search radar. Modification of the target's signature in many cases is not totally effective, and therefore target simulators or decoys are used to further inhibit indentification of the real target. In order to be effective for this purpose, the decoy must duplicate the target vehicle's radar cross-section or signature, as well as its speed and body motions. Targets of appreciable size such as spacecraft have a broad band frequency response which necessitates a target simulator or decoy of similar band width.

The radar cross-section of a typical decoy is aspect sensitive. That is to say, a decoy, when illuminated by a radar beam, exhibits variations, termed scintillation, due to its body motion as seen from the radar site. If this variation or scintillation is sufficiently unlike that of the target, a basis for discrimination exists and the effectiveness of the decoy is substantially reduced. In general, scintillation is also dependent upon the frequency of the illuminating radar, with higher radar frequencies resulting in higher scintillation rate.

SUMMARY OF THE INVENTION

This invention provides an improved radar decoy having means for controlling and varying its scintillation or scintillation rate over a wide range without altering either the physical structure or body motion of the decoy. The scintillation is varied in random fashion at a relatively slow rate to simulate the varying scintillation of a full size target space vehicle, such as a screened ballistic missile. Such scintillation control may be applied to any missile or satellite decoy whose physical structure provides the equivalent of electrical terminals, such as dipole elements, which are required for electrical continuity, and between which a variable electrical impedance may be applied to vary the effective scintillation rate of the decoy. One disclosed embodiment of the invention, for example, is a pincushion decoy similar to that disclosed in copending application Ser. No. 591,395, wherein the equivalent terminals are provided by selected dipoles of the decoy. Another disclosed embodiment of the invention is a re-entry vehicle decoy having sets of interconnected dipoles providing equivalent terminals. Yet another embodiment of the invention is a so-called Luneberg lens in which the equivalent terminals are provided by microwave reflectors on the surface of the lens.

According to the invention, scintillation control is accomplished by connecting between the equivalent electrical terminals of the decoy an electrical impedance whose impedance value is varied in some way during the flight of the decoy. In one disclosed embodiment of the invention, for example, the variable impedance is provided by a motor driven variable resistance device connected between the equivalent terminals of the decoy. In another disclosed embodiment, the variable impedance is provided by a solid state electrically variable impedance circuit. In both embodiments, the variable impedance applied between the equivalent terminals varies the scintillation magnitude or scintillation rate of the decoy. Scintillation rate may also be made to depend upon the frequency of the illuminating radar in order to prevent utilization of discrimination techniques based upon frequency diversity.

DESCRIPTION OF THE PREFERRED EMBODIMENTS

Figure 1:
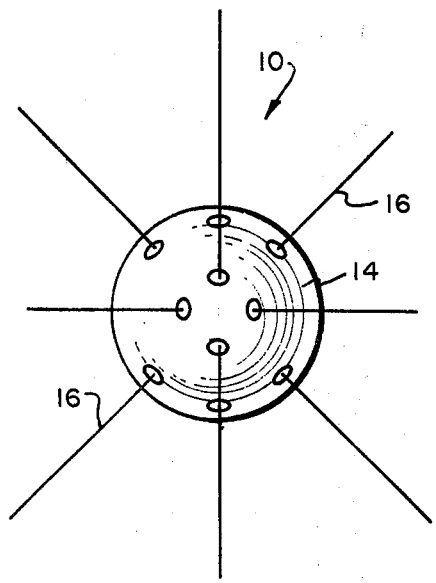
FIG. 1 illustrates a pincushion decoy equipped with a present scintillation control means.
Figure 2:
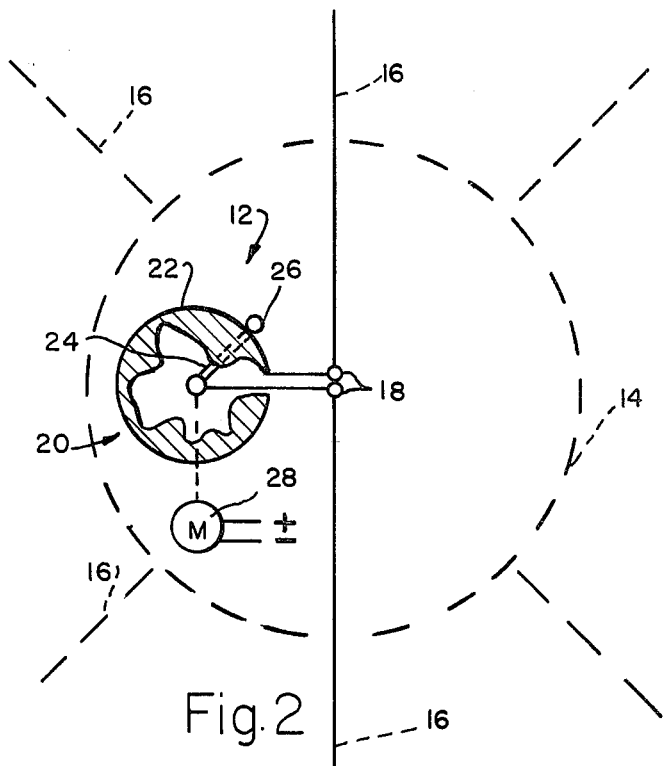
FIG. 2 illustrates the scintillation control means.

FIGS. 1 and 2 illustrate a pincushion decoy 10, similar to that disclosed in copending application Ser. No. 591,395, embodying scintillation control means 12, according to the invention. Decoy 10 has a spherical body 14 mounting a number of microwave reflectors 16 in the form of projecting dipoles arranged in sets as explained in the copending application. The reflectors consist of dipoles of various lengths and hence various resonant frequencies electrically connected through a controllable impedance at their inner ends within body 14. The dipoles of the different sets have different resonant frequencies and may differ in number, all as explained in the copending application. By selectively varying the number and resonant frequency of the dipoles of the different sets, a composite radar signature may be created which duplicates the radar signature of the protected satellite or missile. Simulation or duplication, by the decoy, of the ballistic coefficient of the protected missile or satellite may be accomplished by providing the body of the decoy with the proper density.

As noted earlier, the present invention may be applied to any missile or satellite decoy whose physical structure provides the equivalent of electrical terminals between which a variable electrical impedance may be applied to control or vary the scintillation of the decoy. The scintillation control means 12 comprises means for varying the reflectivity of the reflectors 16 in such a way as to produce a varying scintillation effect. In the particular decoy 10 illustrated the scintillation control means comprises equivalent terminals 18 provided by a pair of diametrically opposed dipoles 16 of the decoy, and variable electrical impedance means 20 connected between the terminals. A variety of variable impedance means may be utilized in the decoy. The variable impedance means shown is a motor driven variable resistance device.

Variable resistance device 20 comprises a generally annular, radially slotted resistor 22, an arm 24 rotatable about the center of the resistor, a wiper 26 on the arm which bears against the outer circumference of the resistor, and a motor 28 for driving the wiper arm in rotation and thereby the wiper around the resistor. One dipole terminal 18 is connected to the resistor 22. The other dipole terminal is connected to the inner end of the wiper arm 24. As shown, the radial width of the resistor 22 varies in a manner such that its electrical resistance, measured between the dipole terminals 18, varies as the wiper 26 travels about the resistor. This variable electrical resistance is applied between the terminals 18 and varies the scintillation magnitude or scintillation rate of the decoy in addition to the variation in scintillation rate of the decoy produced by its body motion. Thus, introduction of the variable resistance between terminals 18 causes the radar cross-section of the decoy to vary as the resistance is changed from the characteristic resistance of the dipoles (about 70 ohms) to either higher or lower values. In actual practice, it is preferable to use lower resistance values ranging from the above characteristic dipole resistance to essentially a short circuit. The scintillation magnitude or scintillation rate of the decoy may be concentrated in selected frequency bands by selection of the proper variable resistance range and the proper dipole elements.

Figure 3:
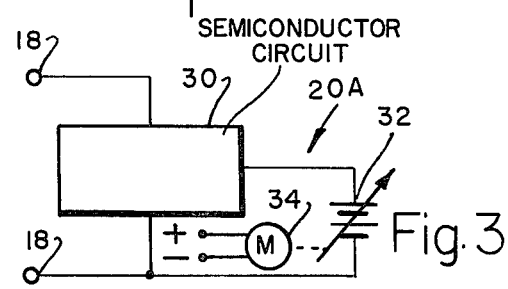
FIG. 3 illustrates a modified scintillation control means according to the invention.

FIG. 3 illustrates a variable impedance means or circuit 20A which may be employed in the decoy 10 in place of the variable resistance device 20. This variable impedance circuit comprises a semiconductor means 30 which is connected between the decoy dipole terminals 18 and whose electrical impedance is controlled by a variable d-c voltage source 32. The adjustable element of this voltage source is driven by a motor 34 which causes the electrical impedance of the semiconductor means to vary in a predetermined manner.

While the drawings illustrate scintillation control by varying the electrical impedance between only a pair of dipoles, it will be understood that additional variable impedance means may be applied between other dipoles to effect greater control of the scintillation rate.

Figure 4:
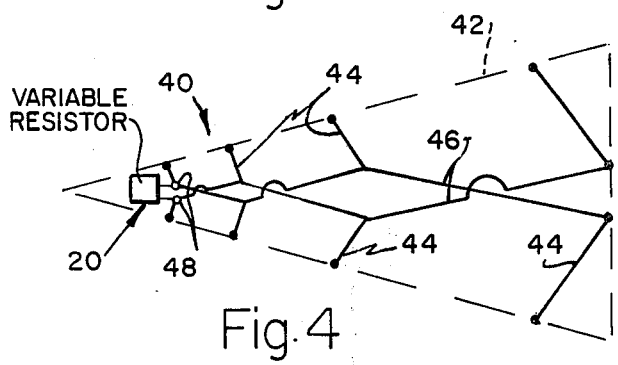
FIG. 4 illustrates a reentry vehicle decoy equipped with a present scintillation control means.
Figure 5:
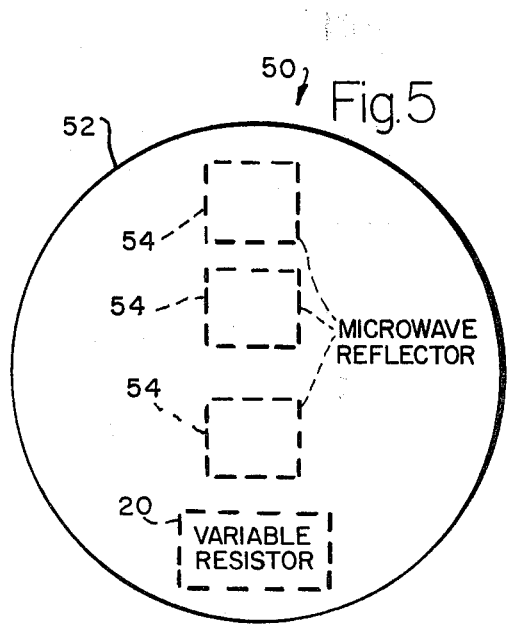
FIGS. 5 and 6 illustrate a Luneberg lens equipped with a present scintillation control means.
Figure 6:
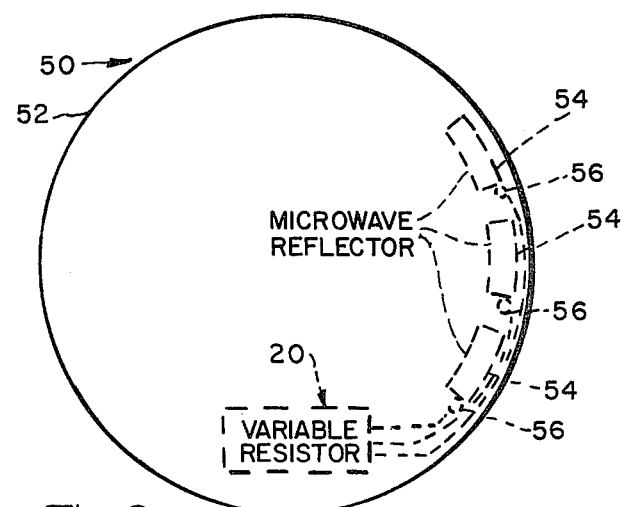

As noted earlier, the invention may be applied to any missile or satellite decoy whose structure provides the equivalent of electrical terminals between which a variable electrical impedance may be applied to control scintillation. FIGS. 5 and 6 illustrate two alternative decoy configurations whose scintillation may be controlled in this manner. The decoy 40 of FIG. 4 is a reentry vehicle decoy having a conical body 42 containing microwave reflectors or dipoles 44 interconnected by conductors 46. This dipole arrangement provides terminals 48 between which a variable impedance means, such as means 20 or 20A, may be inserted to control scintillation magnitude or rate.

The modified decoy 50 of FIGS. 5 and 6 is a Luneberg lens having a spherical body 52 constructed of a dielectric material whose dielectric characteristics vary in such a manner as to provide focussing of incident energy. At the right-hand side of the decoy body, as the decoy is viewed in FIG. 6, are a number, in this instance three, microwave reflectors 54. As is well-known to those versed in the art, such a Luneberg lens is effective to focus radar energy incident on the left side of the lens in FIG. 5 on a region along the right-hand circumference of the lens determined by the direction of the propagation vector of the incident radar energy. If the focal region of the radar energy includes two or more of the reflectors 54, the energy is reflected back toward its source. This reflection, and hence the scintillation rate of the decoy, can be controlled by interconnection of a variable electrical impedance between the reflectors. To this end, reflectors 54 provide electrical terminals 56 between which a present variable impedance means 20 or 20A is connected to control scintillation rate. It will be understood at this point that the invention provides a means for varying the reflectivity of the microwave reflectors in such a way as to introduce into radar energy reflecting from the decoy a randomly varying scintillation effect simulating the varying of a larger space vehicle such as a screened ballistic missile or a sateillite. In other words, the scintillation of the decoy is matched to that of a larger target vehicle. This requires that the reflectivity and hence decoy scintillation be varied in random manner and at a relatively slow rate on the order of a few cycles per second. The scintillation control means of the present decoy satisfies these requirements. The resistor 22 of FIG. 2, for example, is provided with a randomly varying shape and its wiper 24 is driven at a relatively slow rotary speed.

We claim:

1. A controlled scintillation radar decoy comprising;
   a decoy body;
   microwave reflectors mounted on said body for reflecting incident radar energy in a manner to simulate the radar cross-section of a larger space vehicle to be protected; and
   means for varying the reflectivity of said reflectors in random manner and at a relatively slow rate in such a way as to introduce into radar energy reflecting from the decoy a randomly varying scintillation effect simulating the varying scintillation of said space vehicle.

2. A decoy according to claim 1, wherein:
   said means comprises a motor driven variable impedance device.

3. A decoy according to claim 2 wherein:
   said said device comprises an electrical resistor having an electrical resistance which varies along the resistor, a wiper engaging said resistor, and a motor for driving said resistor and wiper in relative movement to effect relative movement of said wiper along said resistor and thereby vary the electric resistance between said reflectors.

4. A decoy according to claim 3 wherein:
   said resistor is a generally annular resistor, and said wiper is rotatable about the center of said resistor.

5. A decoy according to claim 1 wherein:
   said means comprises an electronically variable impedance device.

6. A decoy according to claim 5 wherein:
   said variable impedance device comprises a semiconductor means connected between said reflectors, means connected to said semicondutor means for varying the electrical impedance of the latter means.

7. A decoy according to claim 1 wherein:
   said microwave reflectors comprise dipoles spaced about said body.

8. A decoy according to claim 1 wherein:
   said body has a spherical shape; and
   said microwave reflectors comprise dipoles projecting from said body.

9. A decoy according to claim 1 wherein:
   said body has a conical shape; and
   said microwave reflectors comprise dipoles embedded within said body.

10. A decoy according to claim 1 wherein:
    said body constitutes a Luneberg lens; and
    said microwave reflectors are disposed along one side of said body.

* * * * *